United States Patent Office 3,546,309
Patented Dec. 8, 1970

3,546,309
TRIMERIZATION OF BUTADIENE
Theodore Augur Koch and Herbert Sousa Eleuterio, Wilmington, Del., assignors to E. I. du Pont de Nemours and Company, Wilmington, Del., a corporation of Delaware
No Drawing. Filed May 29, 1969, Ser. No. 829,140
Int. Cl. C07c 3/00
U.S. Cl. 260—666                                      15 Claims

ABSTRACT OF THE DISCLOSURE

The present invention relates to a process for the trimerization of butadiene to cyclododecatriene-(1,5,9) (CDDT) using a catalyst prepared from an organoaluminum sesquichloride, certain tetravalent titanium compounds, and an aldehyde, ketone, epoxide or anhydride.

BACKGROUND OF THE INVENTION

The production of cyclododecatriene-(1,5,9) by subjecting butadiene to the action of various catalysts is known. Butadiene trimerization catalysts, based on alkylaluminum chlorides and titanium halides, such as those described in Schneider et al., U.S. Pat. No. 3,076,045, and Wilke, U.S. Pat. No. 2,964,574, are known.

SUMMARY OF THE INVENTION

The present invention is an improvement both in rate of reaction, smoothness of operation and in ultimate yield over these above-mentioned prior processes involving the use of a certain catalyst system under certain reaction conditions.

The preferred catalyst system is prepared from certain hereinafter defined aluminum sesquichlorides, certain hereinafter defined titanium compounds and one or more taken from the groups characterized as aldehydes, ketones, epoxides, or anhydrides as promoters. Catalyst components are preferably limited to these three. For convenience, the exact composition of the organometallic compound may be varied and described as any composition having the following ratio of composition:

$$(Z)_{(2.5-3.5)}Al_2Cl_{(3.5-2.5)}$$

wherein Z is selected from the class consisting of alkyl radicals containing from 2 to 4 carbon atoms and the phenyl radical. The ratio of the aluminum sesquichloride to promoter should be maintained at from 1/0.05 (mole) to 1/10 (mole) when butadiene is used as the starting material with from 1/0.2 to 1/0.7 being the especially preferred range. The effect of the promoters is surprising because their effect could not be predicted as a priori.

The ratio of the aluminum sesquichloride to titanium compound is not so critical. The molar ratio of the aluminum sesquichloride to titanium compound may be varied from 3/1 to 30/1 with ratios of from 5/1 to 15/1 being preferred. Higher ratios may be used but are not desirable because of the expense of the aluminum sesquichloride.

Generally speaking, any tetravalent titanium compound is operable in the present process as long as it is soluble in the reaction medium to an extent of at least 0.01 mole percent as based on cyclododecatriene-(1,5,9) at 20° C. and which compound does not contain a substituent which inactivates the aluminum sesquichloride catalyst. These compounds generally have the formula $TiA_4$ wherein A is selected from the class consisting of Cl, Br, I or OR, wherein R is a hydrocarbon radical of from 1 to 20 carbon atoms. The four A's used in a given titanium compound may be the same or different. For continuous operation, it is convenient to add all three catalyst components separately and simultaneously to the reaction vessel.

In carrying out the present invention, the promoter may be added with a diluent. If the promoter is to be added in the liquid phase it preferably is dissolved in an inert organic solvent such as benzene, cyclohexane, cyclododecatriene, or hexane. If the promoter is to be added in the gas phase, it should be a gas stream containing promoter vapor up to but not exceeding the saturation point, the gas being either butadiene or an inert gas such as nitrogen.

The promoters for use in the present invention are selected from the class consisting of aldehydes, ketones, epoxides, and anhydrides. The aldehydes suitable for use as promoter in the present invention have the structure RCHO where R is hydrogen or a hydrocarbon radical containing from 1 to 15 carbon atoms as stated in claim 1. The ketones suitable for use as promoters in the present invention have the structure

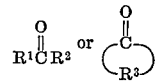

where $R^1$ is a phenyl or an alkyl radical of from 1 to 10 carbon atoms and $R^2$ is a phenyl or an alkyl radical of from 1 to 10 carbon atoms, and where $R^3$ is an alkylene radical of from 4 to 15 carbon atoms. Diketones having the formula

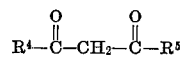

are also useful promoters, $R^4$ is an alkyl radical of from 1 to 10 carbon atoms and $R^5$ is an alkyl radical of from 1 to 10 carbon atoms. The epoxides suitable for use in the present invention have the structure

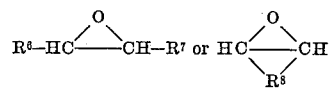

wherein $R^6$ is a hydrocarbon radical of from 1 to 10 carbon atoms and $R^7$ is a hydrocarbon radical of from 1 to 10 carbon atoms, and wherein $R^8$ is an alkylene radical containing from 6 to 20 carbon atoms. The anhydrides suitable for use in the present invention have the structure

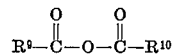

wherein $R^9$ is an alkyl radical of from 1 to 10 carbon atoms, and $R^{10}$ is an alkyl radical of from 1 to 10 carbon atoms.

The butadiene trimerization reaction can be run in any inert organic solvent such as benzene, cyclohexane or hexane. Cyclododecatriene, the reaction product, is an excellent solvent and the preferred one for continuous operation.

The butadiene trimerization reaction temperature generally is maintained at from 20 to 120° C. and preferably at from 60 to 90° C. At lower temperatures, the reaction rates become unduly slow and at higher temperatures, increasing yield losses to by-products occur.

Pressure may be varied from ½ atm. to 50 atm. preferably at from 1 to 5 atm.

By operating within the hereinabove set forth limits, butadiene trimer is formed at average reaction rates above 5.0 g./min./mmole of $TiA_4$ present and generally in yields of from 83 to 95 percent when using ethyl aluminum sesquichloride as the cocatalyst.

When in continuous operation, the reaction may be carried out in multiple stages to take advantage of residual catalyst activity.

Cyclododecatriene is a valuable chemical intermediate which can be readily oxidized to succinic acid which is useful in the production of plastics such as polyamides. It also may be hydrogenated in known manner. Thus, cyclododecene or cyclododecane is obtained from cyclododecatriene. These hydrogenated products may, in turn, be oxidized in known manner to form the corresponding dicarboxylic acids.

DESCRIPTION OF THE PREFERRED EMBODIMENTS

In each of Examples 1 to 17, Table I, to a 1500 ml. rounded bottom cylindrical reactor fitted with rubber stopper, condenser with outlet to a mercury bubbler, thermocouple, high speed stirrer, and gas inlet, well dried and flushed with inert gas, is added 500 ml. of cyclododecatriene containing less than 5 parts per million water. The cyclododecatriene is heated to 75° C.±1° C. and the solution of organometallic as described in Table I is injected while rapidly stirring followed by the titanium tetrachloride and promoter solutions as indicated in Table I. During the addition the solution is sparged with dry butadiene (<1 part per million water) slightly more rapidly than it is absorbed to maintain a purge of a few cc./min. through the trap. While holding the temperature at 75°±1° C., steady state productivity is reached and a 5 ml. sample of the reaction medium is removed. The sample is deactivated with isopropyl alcohol and the crude reaction mixture analyzed by gas chromatography. The average rate of the reaction throughout a run is given as the number of grams of crude cyclododecatriene produced per hour on the basis of aerated liquid volume of reactor space. Example 17 illustrates the poor rate and yield obtained in the absence of a promoter.

INTRODUCTION TO TABLE I

The following abbreviations are used in Table I. The letters C and CoC are catalyst and cocatalyst, P is promoter, EASC and OASC are ethyl aluminum sesquichloride and phenyl aluminum sesquichloride, respectively p.s.i.g. is pounds per square inch guage pressure, CDDT is 1,5,9-cyclododecatriene, VCH is 4-vinyl cyclohexene, COD is 1,5-cyclooctadiene and NVR is non-volatile residue. Under the column titled Catalyst Feed rate, g./gal./hr. is the grams of $TiCl_4$ injected in one gallon reactor aerated liquid volume in one hour. Under productivity, lbs./gal./hr. represents pounds of crude CDDT produced in one gallon of reactor aerated liquid volume in one hour. Under the same title productivity is also expressed as g./liter/hr. This is the grams of crude CDDT produced in one liter of reactor aerated liquid volume in one hour.

TABLE I

| Example | Promoter and how used | CoC and how used | C and how used | Mol ratio, CoC/C/P | Pressure P.S.I.G | C feed rate g./gal./hr. | Productivity lb./gal./hr. (g./liter/hr.) | Percent yield CDDT/VCH/COD/NVR |
|---|---|---|---|---|---|---|---|---|
| 1 | Acetaldehyde, 1.38 M in cyane | EASC, 0.7573 M in cyane | $TiCl_4$, 0.2878 M in cyane | 8.8/1/3.6 | 1.5 | 1.12 | 6.1 (732 g./liter/hr.) | 83.9/1.0/1.6/9.8 |
| 2 | Acetone, 1.36 M in cyane | do | do | 9.9/1/5.6 | 1.5 | 1.04 | 6.9 (822 g./liter/hr.) | 86.3/1.4/3.0/7.0 |
| 3 | Acetone, 1.748 M in cyane | EASC, 0.6670 M in cyane | $TiCl_4$, 0.4296 M in cyane | 10.1/4.8 | 1.0 | 1.01 | 7.5 (898 g./liter/hr.) | 87.2/1.5/3.7/10.9 |
| 4 | Acetone, 1.729 M in cyane | EASC, 0.8162 M in cyane | $TiCl_4$, 0.6344 M in cyane | 10.1/4.8 | 5.0 | 1.01 | 9.2 (1,100 g./liter/hr.) | 85.7/1.7/3.9/7.0 |
| 5 | Benzophenone, 1.37 M in cyane | EASC, 0.7202 M in cyane | $TiCl_4$, 0.2878 M in cyane | 9.2/1/3.7 | 1.5 | 1.07 | 8.6 (1,030 g./liter/hr.) | 88.2/1.6/3.6/7.6 |
| 6 | do | do | do | 10.1/4.3 | 1.5 | 0.99 | 8.0 (958 g./liter/hr.) | 88.3/1.5/3.0/7.1 |
| 7 | Benzophenone, 1.17 M in cyane | do | do | 10/1/3 | 1.5 | 1.0 | 5.9 (707 g./liter/hr.) | 85.1/1.8/3.1/7.5 |
| 8 | do | do | do | 10/1/3 | 1.5 | 1.0 | 7.7 (923 g./liter/hr.) | 85.9/2.2/4.3/6.3 |
| 9 | Benzophenone, 0.9953 M in benzene | EASC, 0.6670 M in benzene | do | 10/1/5 | 6.5 | 1.01 | 7.9 (945 g./liter/hr.) | 88.5/1.7/3.7/7.3 |
| 10 | do | OASC, 1.760 M in chlorobenzene | do | 10/1/5 | 1.0 | 1.01 | 8.1 (970 g./liter/hr.) | 79.1/1.9/8.6/10.6 |
| 11 | Cyclododecanone, 1.38 M in cyane | EASC, 0.7573 M in cyane | $TiCl_4$, 0.2878 M in cyane | 9.8/1/7 | 1.5 | 1.04 | 8.0-8.5 (958-1,020 g./liter/hr.) | 85.9/1.4/2.7/8.6 |
| 12 | 2,4-pentanedione, 1.12 M in cyane | do | do | 10/1/2.7 | 1.5 | 1.02 | 7.3 (875 g./liter/hr.) | 86.8/1.7/3.1/7.7 |
| 13 | 1,2-epoxy-5,6-trans-9,10-cis-cyclododecadiene, 1.41 M in cyane | do | so | 10/1/6.3 | 1.5 | 1.06 | 5.6 (672 g./liter/hr.) | 84.6/1.1/2.2/12.2 |
| 14 | Cyclododecene oxide, 1.08 M in benzene | EASC, 0.7202 M in cyane | $TiCl_4$, 0.3015 M in cyane | 10.5/1/5.1 | 1.5 | 0.95 | 6.7 (803 g./liter/hr.) | 86.1/1.5/2.1/9.7 |
| 15 | Acetic anhydride, 1.02 M in benzene | do | do | 10.7/1/2.2 | 1.5 | 1.0 | 6.1 (731 g./liter/hr.) | 85.6/1.1/1.1/9.3 |
| 16 | do | do | do | 10.8/1/2.0 | 6.5 | 1.0 | 8.0 (958 g./liter/hr.) | 85.9/1.2/1.4/8.6 |
| 17 | None (control) | EASC, 0.7573 M in cyane | $TiCl_4$, 0.2878 M in cyane | 10/1/0 | 1.5 | 1.04 | 1.0-1.5 (120-180 g./liter/hr.) | 63.5/5.9/1.1/24.0 |

What is claimed is:
1. A continuous process for the production of cyclododecatriene-(1,5,9), which consists essentially of charging a reactor with an aluminum compound of the structure $Z_{2.5-3.5}Al_2Cl_{3.5-2.5}$ wherein Z is selected from the class consisting of alkyl radicals containing from 2 to 4 carbon atoms and the phenyl radical, with from 0.05 to 1.0 mole of a promoter per mole of aluminum compound, said promoter being selected from the class consisting of compounds of the structures

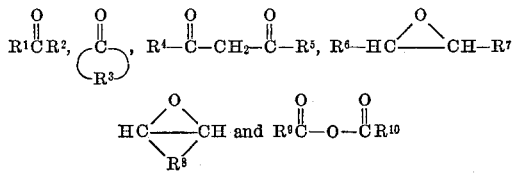

wherein R is hydrogen or an alkyl radical of from 1 to 15 carbon atoms, $R^1$ is a phenyl radical or an alkyl radical of from 1 to 10 carbon atoms, $R^2$ is a phenyl radical or a hydrocarbon radical of from 1 to 10 carbon atoms, $R^3$ is an alkylene radical of from 4 to 15 carbon atoms, $R^4$ is an alkyl radical of from 1 to 10 carbon atoms, $R^5$ is an alkyl radical of from 1 to 10 carbon atoms, $R^6$ is an alkyl radical of from 1 to 10 carbon atoms, $R^7$ is an alkyl radical of from 1 to 10 carbon atoms, $R^8$ is an alkylene radical of from 6 to 10 carbon atoms, $R^9$ is an alkyl radical of from 1 to 10 carbon atoms and $R^{10}$ is an alkyl radical of from 1 to 10 carbon atoms, a titanium compounds of the formula $TiA_4$ wherein A is selected from the class consisting of Cl, Br, I and OR wherein R is a hydrocarbon radical of from 1 to 20 carbon atoms, in an amount such that the molar ratio of the aluminum compound to the titanium compound is maintained at from 3:1 to 30:1, and butadiene, maintaining the contents of said reactor at a temperature of from 20 to 120° C. and recovering cyclododecatriene-(1,5,9).

2. The process of claim 1 wherein the molar ratio of the aluminum compound to the titanium compound is from 5:1 to 15:1.

3. The process of claim 2 wherein the titanium compound is titanium tetrachloride.

4. The process of claim 2 wherein the aluminum compound is ethylaluminum sesquichloride.

5. A process of claim 2 wherein the aluminum compound is phenyl aluminum sesquichloride.

6. The process of claim 1 wherein from 0.2 to 0.7 mole of promoter per mole of ethylaluminum sesquichloride is used.

7. A process of claim 2 wherein the reactor pressure is 0 to 6.5 p.s.i.g.

8. The process of claim 7 wherein the promoter is acetaldehyde.

9. The process of claim 7 wherein the promoter is acetone.

10. A process of claim 7 wherein the promoter is benzophenone.

11. A process of claim 7 wherein the promoter is cyclododecanone.

12. A process of claim 7 wherein the promoter is 2,4-pentanedione.

13. A process of claim 7 wherein the promoter is 1,2-epoxy-5,6-trans-9,10-cis-cyclododecadiene.

14. A process of claim 7 wherein the promoter is cyclododecene oxide.

15. A process of claim 7 wherein the promoter is acetic anhydride.

References Cited
UNITED STATES PATENTS

| | | | |
|---|---|---|---|
| 2,964,574 | 12/1960 | Wilke | 260—666B |
| 2,979,544 | 4/1961 | Wilke | 260—666B |
| 3,076,045 | 1/1963 | Schneider | 260—666B |
| 3,149,173 | 9/1964 | Wittenberg | 260—666B |
| 3,344,199 | 9/1967 | Brenner | 260—666B |
| 3,381,047 | 4/1968 | Eleuterio | 260—666B |
| 3,381,045 | 4/1968 | Koch | 260—666B |

DELBERT E. GANTZ, Primary Examiner

V. O'KEEFE, Assistant Examiner

PO-1050
(5/69)

UNITED STATES PATENT OFFICE
CERTIFICATE OF CORRECTION

Patent No. 3,546,309      Dated December 8, 1970

Inventor(s) Theodore Augur Koch & Herbert Sousa Eleuterio

It is certified that error appears in the above-identified patent and that said Letters Patent are hereby corrected as shown below:

Column 5, line 10 (Claim 1), after "structures" insert "RCHO,".

SIGNED AND
SEALED
MAR 9 1971

(SEAL)
Attest:

Edward M. Fletcher, Jr.
Attesting Officer

WILLIAM E. SCHUYLER, JR.
Commissioner of Patents